(12) United States Patent
Matthias et al.

(10) Patent No.: US 11,951,561 B2
(45) Date of Patent: Apr. 9, 2024

(54) METHOD FOR PRODUCING A WELDED CAVITY VALVE

(71) Applicant: FEDERAL-MOGUL VALVETRAIN GMBH, Barsinghausen (DE)

(72) Inventors: Thorsten Matthias, Garbsen (DE); Antonius Wolking, Barsinghausen (DE)

(73) Assignee: Federal-Mogul Valvetrain GmbH, Barsinghausen (DE)

(*) Notice: Subject to any disclaimer, the term of this patent is extended or adjusted under 35 U.S.C. 154(b) by 595 days.

(21) Appl. No.: 17/274,586

(22) PCT Filed: May 21, 2019

(86) PCT No.: PCT/EP2019/063054
§ 371 (c)(1),
(2) Date: Mar. 9, 2021

(87) PCT Pub. No.: WO2020/052818
PCT Pub. Date: Mar. 19, 2020

(65) Prior Publication Data
US 2022/0048130 A1 Feb. 17, 2022

(30) Foreign Application Priority Data
Sep. 13, 2018 (DE) ...................... 10 2018 122 441.9

(51) Int. Cl.
*B23K 20/12* (2006.01)
*B23K 13/01* (2006.01)
(Continued)

(52) U.S. Cl.
CPC ............ *B23K 20/129* (2013.01); *B23K 13/01* (2013.01); *B23K 2103/04* (2018.08); *F01L 3/20* (2013.01)

(58) Field of Classification Search
CPC ...... B23K 13/01; B23K 20/12; B23K 20/129; B23K 2103/04; F01L 2303/00; F01L 3/14; F01L 3/20; H03M 13/13; H03M 13/618; H03M 13/635; H03M 13/6502; H03M 13/6588; H04L 1/00; H04L 1/0057; H04L 1/0058; H04L 1/0067; H04L 1/0068; H04L 1/0069
(Continued)

(56) References Cited

U.S. PATENT DOCUMENTS

| | | | |
|---|---|---|---|
| 3,874,636 A * | 4/1975 | Bake ....................... | F16K 31/50 251/335.2 |
| 2009/0020082 A1* | 1/2009 | Suzuki ..................... | F01L 3/14 123/41.41 |

FOREIGN PATENT DOCUMENTS

| | | |
|---|---|---|
| DE | 10209770 A1 | 10/2003 |
| DE | 102007026328 A1 | 2/2008 |

(Continued)

*Primary Examiner* — Quang T Van
(74) *Attorney, Agent, or Firm* — Robert L. Stearns; Dickinson Wright PLLC

(57) ABSTRACT

A method for producing a cavity valve is provided. The method includes providing a valve body which has a cavity in the interior. The valve body has a circular opening having an opening edge surface on a bottom side. A circular valve cover with a cover edge surface is provided. Inductive heating of at least one of the opening edge surface or the cover edge surface takes place and then welding the valve body to the valve cover by friction welding of the opening edge surface to the cover edge surface.

13 Claims, 2 Drawing Sheets

(51) Int. Cl.
*B23K 103/04* (2006.01)
*F01L 3/20* (2006.01)

(58) Field of Classification Search
USPC ............... 219/612, 615, 616, 617, 635, 641
See application file for complete search history.

(56) References Cited

FOREIGN PATENT DOCUMENTS

| DE | 102008034930 A1 | 1/2010 |
| DE | 102015220891 A1 | 4/2017 |
| EP | 1213087 A2 | 6/2002 |

\* cited by examiner

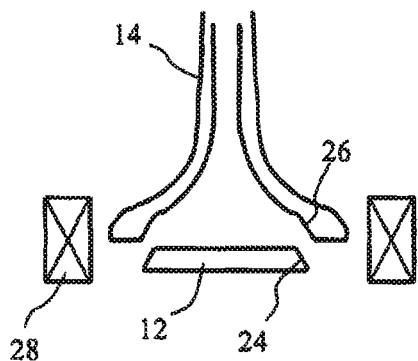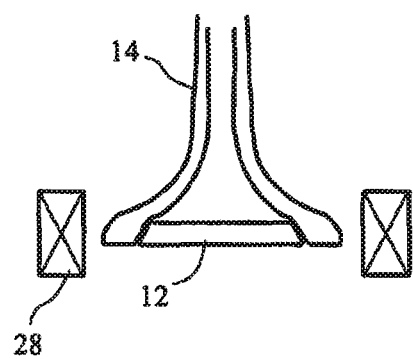
Fig. 3     Fig. 4
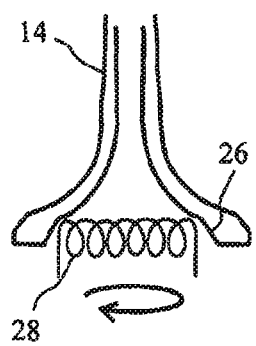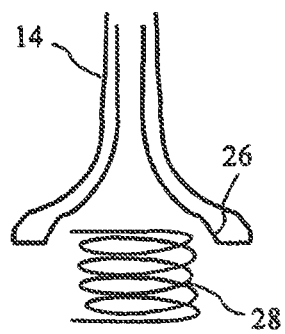
Fig. 5A     Fig. 5B
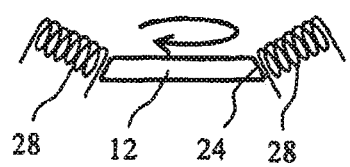
Fig. 6

METHOD FOR PRODUCING A WELDED CAVITY VALVE

BACKGROUND

1. Technical Field

The present invention relates to cavity valves in which the cavity on the valve disk is closed by welding a valve base.

2. Related Art

Valves (or poppet valves) of internal combustion engines, in particular outlet valves, are thermally highly stressed during operation. Thus, in the region of the transition from valve disk into the valve stem, temperatures of above 800° C. can occur, with the result that the strength of the valve material is considerably reduced. Inlet valves achieve temperatures of about 300° C. to 550° C., outlet valves can be above 900° C. hot. By using sodium-cooled valves, i.e. cavity valves in the cavity of which sodium is located as cooling medium (so-called shaker cooling), the temperature of the valves can be reduced by up to 150° C. An enlarged cavity which not only extends along a bore in the valve stem but also extends radially beyond the bore into the valve disk results in a stronger cooling and also in a reduction in the weight.

A method for producing a cavity valve consists in initially producing a valve body, then introducing the cavity starting from the valve bottom side (e.g. drilling or milling) and then closing the cavity on the valve disk, by welding a cover, i.e. a valve base, to the valve body, a cooling medium (sodium) can optionally be poured into the cavity before welding. An advantage of this method compared with cavity valves produced by forming technology is a higher variability of the cavity, i.e. due to the subsequent welding of the valve to a cover, there is the possibility to configure the geometry of the cavity more flexibly.

Usually the welding of cavity valves is performed by simple methods such as, for example, laser welding or friction welding; cf. for example, DE 10209770 A1. However, this method is subject to restrictions in its applicability. For example, in laser welding weld joint and laser focus must be positioned exactly, which necessitates expensive guide elements, in arc welding only low welding speeds are possible and high penetration depths are produced, i.e. large heat influence zones, which leads to distortion and an influencing of material properties and in friction welding, large weld beads are formed which necessitates reworking which, however, is not possible in the cavity, i.e. inside the valve so that the weld bead there remains in place and negatively influences the cooling.

DE102015220891 A1 discloses a method for producing a hollow valve, wherein the valve body is formed by rolling and the valve cover in particular can be connected to the valve body by friction welding. EP 1213087 A2 discloses a method for connecting a solid stem consisting of a Ti alloy to a valve head consisting of a TiAl intermetallic compound by means of friction welding, wherein the valve head whose material has a higher temperature resistance is inductively heated. DE 102007026328 A1 relates to a method for firmly bonded connection of two highly heat-resistance components made of materials which deform at variously high temperatures, by means of friction welding, wherein the component that only deformed at a higher temperature is inductively heated. DE 102008034930 A1 relates to a joining method for connecting two components of which one comprises a single-crystal or directionally solidified material, by means of friction welding, wherein at a provided joining surface a polycrystalline layer is produced by introducing deformation or distortion energy into a thin near-surface layer and a subsequent heat treatment (inductive heating).

Accordingly, it is the aim of the present invention to provide a weld connection between cover (i.e. the valve base) and the valve body (i.e. hollow valve without valve base) in which only a narrow heat influence zone is produced and weld beads are kept as small as possible.

SUMMARY

The method for producing a cavity valve comprises providing a valve body which has a cavity in the interior, wherein the valve body has a circular opening having an opening edge surface on a bottom side, providing a circular valve cover with a cover edge surface, inductive heating of the opening edge surface and/or cover edge surface, and welding the valve body to the valve cover by friction welding of the opening edge surface to the cover edge surface.

According to a further aspect, the inductive heating of opening edge surface and/or cover edge surface is carried out up to a temperature above the recrystallization temperature of a material of valve body or valve cover.

According to a further aspect, the method can furthermore comprise inductive supply of energy by means of an induction heater after the step of welding in order to control a cooling speed.

According to a further aspect, the method can comprise further reworking a valve base surface of the welded cavity valve.

According to a further aspect, the method can comprise moving valve body and valve cover towards one another after and/or during the inductive heating until the opening edge surface and the cover edge surface are in contact, turning the valve body and the valve cover relative to one another for a predetermined friction welding time interval, wherein opening edge surface and cover edge surface are pressed against one another with a first pressure and pressing the opening edge surface and the cover edge surface onto one another with a second pressure after completing the turning for a predetermined cooling time.

According to a further aspect, the welding can take place under a protective gas.

According to a further aspect, the method can further comprise rotating the valve body or the valve cover relative to an induction heating element during the inductive heating.

According to a further aspect, the inductive heating can take place by means of an induction heater whose frequency is at least 10 kHz.

According to a further aspect, the inductive heating takes place directly at the opening edge surface and/or the cover edge surface, wherein at least 50% of the respective thermal energy is produced in a surface layer under the opening edge surface or the cover edge surface.

According to a further aspect, the surface layer under the opening edge surface or the cover edge surface can have a thickness less than 0.5 mm.

According to a further aspect, the method can comprise inductive heating of the opening edge surface, wherein the inductive heating is accomplished by means of an induction heating element which projects into the cavity.

According to a further aspect, the method comprises filling a cooling medium into the cavity or a valve stem cavity before the welding.

According to a further aspect, valve body and valve cover can consist of different materials.

Instead of the term 'cavity valve', the terms 'hollow disk valve', 'hollow valve' or simply 'valve' are used.

THE DRAWINGS

In the following exemplary embodiments of the invention are described more accurately with reference to the figures, wherein FIG. 1 shows a disk of a hollow disk valve in which the valve cover according to the invention was welded to the valve body by means of friction welding;

FIG. 3 shows an alternative embodiment of the inductive heating in a sectional view;

FIG. 4 shows a further optional step of the method according to the invention;

FIGS. 5A and 5B show alternative embodiments of the inductive heating of the opening edge surface in sectional views; and FIG. 6 shows an alternative embodiment of the inductive heating of the cover edge surface.

Figure 1:
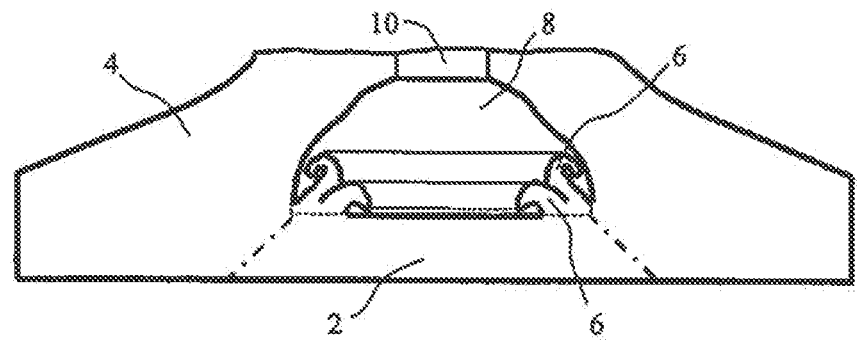

Both in the description and also in the drawing the same reference numbers are used for the same or similar elements or components. A reference list is additionally given which is valid for all the figures. The detailed explanations in the figures are merely schematic and do not necessarily represent the actual size relationships.

DETAILED DESCRIPTION

FIG. 1 shows a disk of a hollow disk valve of the prior art in a sectional view in which the valve cover 2 was welded to the valve body 4 by means of friction welding. The base surface of the valve (which is facing the combustion chamber in the installed state of the valve) lies at the bottom in the figure. During the friction welding valve cover 2 and valve body 4 are pressed towards one another and simultaneously turned or rotated relative to one another, wherein this results in a plasticization of the material due to the friction heat produced. The relative rotation is ended wherein then, whilst the material cools, valve cover and valve body are still pressed against one another for a certain time until the material solidifies again and the welding process is completed. The contact surface between valve cover 2 and valve body 4 on which the weld seam runs is shown by a dot-dash line. During friction welding relatively large weld beads 6 are formed which have the typical shape shown in the figure. These weld beads 6 occupy a considerable part of the cavity 8 in the valve head with the result that the cooling effect by means of a cooling medium (e.g. sodium) is impaired. For comparison the actual idealized shape of the cavity 8 is indicated by a dashed line. In FIG. 1 a bore 10 can furthermore be identified through a valve stem not shown further. The base surface of the valve has already been reworked so that weld beads or welding residue there have been removed.

Figures 2A, 2B, 2C, 2D:
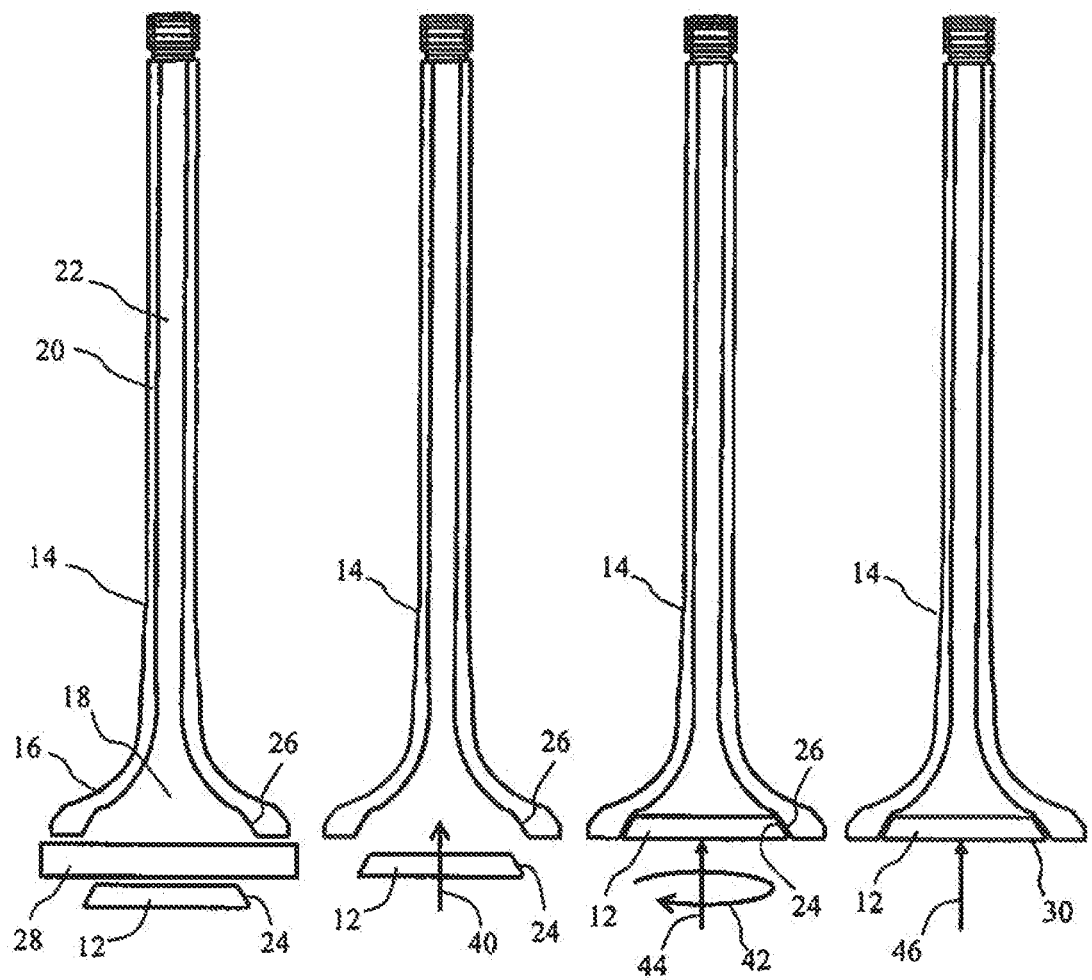
FIGS. 2A to 2D show manufacturing steps according to the present invention in sectional views.

FIGS. 2A to 2D show various process steps according to the present invention in sectional views. Here, FIG. 2A shows an inductive heating, FIG. 2B shows an intermediate step and FIG. 2C and FIG. 2D taken together show a welding step by means of friction welding.

The method begins with the provision of two components, not shown, namely the provision of a valve body or valve body blank and the provision of a valve cover or valve cover blank. The valve body 14 comprises a valve disk or valve head 16 with a cavity 18 (in simplified terms the cavity 18 is located in the valve body 14) and a valve stem 20 in which a valve stem cavity 22 is located which is connected to the cavity 18 in the valve head 16. The valve body 14 is generally rotationally symmetrical about a valve axis which is defined by the valve stem 20. The cavity 18 in the valve head 16 extends as far as a base side of the valve body 14 so that this has an opening on the base side which is circular and defines a rotationally symmetrical opening edge surface 26. Here that side of the valve which faces the combustion chamber in the state installed in an internal combustion engine base surface is designated as base side. The valve cover 12, in a plan view, is also circular and has a rotationally symmetrical cover edge surface 24 at its circumference, i.e. the valve cover is designed to be plate-shaped and is rotationally symmetrical about an axis of rotation; a diameter of the valve cover can vary in the direction of the axis of rotation. Opening edge surface 26 and cover edge surface 24 are configured to correspond to one another, i.e. they have substantially the same shape and size so that they can be placed on one another in order to thus close the cavity 18 in the valve head 16. Preferably the opening edge surface 26 and the cover edge surface 24 are conical.

Valve body 14 and valve cover 12 can be produced by methods known to the person skilled in the art. The valve body 14 can, for example, initially be forged as a body without a cavity and then the cavity 18 and the valve stem cavity 22 can be introduced by drilling or milling from the base side. Other possible methods for producing the valve body 14 are, for example, drawing or swaging or stretching.

After preparing valve body 14 and valve cover 12, at least one of opening edge surface 26 and cover edge surface 24 is inductively heated, preferably both opening edge surface 26 and cover edge surface 24 are inductively heated. This is shown in an exemplary embodiment in FIG. 2A. The inductive heating is accomplished by an induction heater, wherein in FIG. 2A a, for example, plate-shaped induction heating element 28 is placed between valve body 14 and valve cover 12; further parts of the induction heating such as power supply and power supply cable are not shown. An electromagnetic alternating field is produced by means of the induction heating element 28 which results in induction currents in the material of the valve body 14 or the valve cover 12, which in turn as a result of the electrical resistance of the material, results in heating of the same and remagnetization losses also contribute to the heating. In the example shown, the induction heating element 28, for example, comprises turns of an electrical conductor which run around an axis which is parallel to the valve axis, in particular coincides with this so that above and below (i.e. both on the side of the valve body and also on the side of the valve cover 12) of the induction heating element 28 an electromagnetic alternating field can be produced. These turns are then connected via supply cable to the power supply which delivers an alternating current. As a result of this arrangement, the valve cover 12 as a whole and section of the valve body 14 placed on the base side are heated so that the cover edge surface 24 and the opening edge surface 26 are therefore also heated. In the drawing the plate-shaped induction heating element 28 extends over the entire radial ('radial' should be related here to the valve axis or to the radial direction of the circular valve cover) extension of valve body 14 and valve cover 12. Alternatively to this it is also possible to use a smaller plated-shaped induction heating element which only covers partial regions of valve body 14 and valve cover 12 in which parts of the cover edge surface 24 or the opening edge surface 26 are located. In this case, valve body 14 and valve cover 12 should be rotated relative to the induction heating element; see further below. Naturally a plurality of smaller induction heating elements can also be distributed over the circumference.

Preferably the inductive heating takes place until a recrystallization temperature of the material of the valve body 14 or a recrystallization temperature of the material of the valve cover 12 is exceeded.

FIG. 2B shows the following step (after the inductive heating) of a moving of the valve body 14 and the valve cover 12 towards one another. Preferably only one of the two structural elements is moved, in particular preferably only the valve cover 12 is moved as indicated by an arrow 40 in the figure. This movement is carried until opening edge surface 26 and cover edge surface 24 are in contact.

Subsequently, cf. FIG. 2C, valve body 14 and valve cover 12 are turned or rotated relative to one another wherein preferably only one of the two structural elements is rotated, in particular the valve cover 12. At the same time, valve body 14 and valve cover 12 are pressed towards one another so that opening edge surface 26 and cover edge surface 24 are pressed towards one another with a predetermined first pressure. Preferably the valve body 14 is firmly clamped and the valve cover 12 is rotated and pressed against the valve body; this is indicated in the figures by an arrow 42 (rotating) and an arrow 44 (pressing). As a result of the rotation of the opening edge surface 26 and cover edge surface 24 in contact with one another relative to one another, a friction heat is produced which results in the plasticisation of the materials of valve body 14 and valve cover 12 at the contact surface or the contact surfaces (opening edge surface 26 and cover edge surface 24). Accordingly, the rotation and the pressing in order to produce the first pressure is carried out over a pre-determined friction welding time interval until a sufficiently large amount of friction heat is produced.

In order to complete the friction welding process the rotation is then ended and valve body 14 and valve cover 12 are pressed further towards one another so that opening edge surface 26 and cover edge surface 24 are pressed towards one another with a predetermined second pressure. This pressure is maintained over a predetermined cooling period during which the plasticized material is solidified again and thus a friction welded joint is produced between valve body 14 and valve cover 12.

Preferably the welding process, in particular the friction welding is carried out under a protective gas, i.e. an inert gas such as, for example, argon, helium or nitrogen. A suitable cooling medium (sodium) can be poured into the cavity 18 or the valve stem cavity 22 before the welding.

An advantage of this method compared with the method known from the prior art is that a large part of the (thermal) energy required for the welding is supplied by the inductive heating and only a smaller fraction of the energy is produced by friction of the surfaces to be welded during friction welding. As a result, less material is displaced during friction welding so that smaller weld beads are produced which reduce the size of the cavity to a less degree and have a less severe effect on the cooling. Likewise, the inductive heating is only carried out up to a temperature which taken for itself is not yet sufficient for welding, i.e. the heat influence zones can be kept relatively small. Furthermore, the proportional (valve body on the one hand, valve cover on the other hand) introduction of heat can be controlled, which enables the use of differently-sized cross-sections or different materials or substances. For example, the diameter of the valve cover can be somewhat larger than the opening diameter in which case the valve body is then more strongly heated during the inductive heating (brought to a higher temperature) and it expands more severely than the valve cover so that the valve cover can be fitted into the opening and the friction welding can be carried out; during cooling a type of shrink fitting is then produced.

Optionally the valve base surface 30 can be reworked on the base side of the valve in order to eliminate weld beads and weld residue on the outer side of the valve.

FIG. 3 shows an alternative design of the inductive element. Here the induction heating element 28 is not plate-shaped as in the design according to FIG. 2A but is ring-shaped. That is, the induction heating element 28 of the induction heater surrounds the coil which is arranged around the base-side section of the valve body 14 to be heated and the valve cover 12 which is still located at a distance from the valve body. If an alternating current flows through the coil, an electromagnetic alternating field is produced whose magnetic field lines run parallel to the valve axis in the region of the section of the valve body 14 to be heated and the valve cover 12.

Here, for example, only one induction heating element or only one coil were described but naturally a plurality of coils (induction heating elements), possibly one for heating the opening edge surface 26 and one for heating the cover edge surface can be used. Also a combination of a plate-shaped heating element and an annular heating element is also feasible. More generally a plurality of induction heating elements can be used instead of a single induction heating element; 'an induction heating element' should therefore be understood in the sense of this application as 'at least one induction heating element'.

The method can further comprise a rotating of the valve body 14 and/or the valve cover 12 relative to the induction heating element 28 during the inductive heating wherein preferably the valve body 14 and/or the valve cover 12 are rotated and the induction heating element 28 is fixed. Thus, a uniform heating is achieved in the circumferential direction if the inductive heating is not accomplished uniformly over the entire circumference, for example, as a result of the arrangement of the induction heating element or a non-symmetrical electromagnetic field in the circumferential direction.

Optionally even after the welding of valve body 14 and valve cover 12, energy can be supplied by means of an induction heater. As a result, a cooling speed of the welded valve can be controlled, possibly in order to avoid stresses or to reduce the maximum hardness. In FIG. 4 the (thermal) energy supply by means of an annular induction heating element 28 (as in FIG. 3) is shown for this purpose, which is placed so that it can generate an electromagnetic alternating field in the region of the weld point. Naturally a plate-shaped induction heating element (as in FIG. 2A) can also be used here which is then arranged on the base side of the valve.

Preferably the inductive heating is accomplished by means of a (high-frequency) induction heater which is operated at a frequency of at least 10 kHz (kilohertz), preferably at least 15 kHz, further preferably at least 20 kHz. Accordingly the operating frequency preferably lies in the range from 10 kHz to 50 kHz, preferably in the range from 20 kHz to 30 kHz. As a result of the so-called skin effect, the induced current density inside a conductor decreases rapidly with the distance from the surface of the conductor. This decrease typically takes place exponentially, depending on the shape of the conductor and the shape of the electromagnetic field. The penetration depth is used as a measure for this which designates the depth at which the current density has dropped to 1/e of the current density directly at the surface. The penetration depth decreases with $1/\sqrt{f}$, wherein f is the frequency of the electromagnetic field. At a frequency of 10 kHz, the penetration depth for steels is typically already less than 0.5 mm, for many steels less than or equal to about 0.1 mm. If the frequency is correspondingly high, the energy required for heating is introduced within a thin surface layer. This enables the workpieces to be welded to be heated specifically at the surfaces to be welded so that the other regions of the workpieces are heated merely indirectly by heat conduction.

Preferably the inductive heating takes place directly (i.e. specifically) at the opening edge surface and/or cover edge surface. This takes place so that at least 50%, preferably at least 75%, further preferably at least 90% of the thermal energy introduced due to the inductive heated is produced in a surface layer under the opening edge surface or cover edge surface. The thickness of this surface layer—measured from the opening edge surface or the cover edge surface—is preferably less than 0.5 mm, further preferably less than 0.1 mm. FIGS. 5A, 5B and 6 show exemplary embodiments by means of which this can be achieved.

FIG. 5A and FIG. 5B each show an arrangement of an induction heating element 28 by means of which the opening edge surface 26 can be specifically inductively heated. In both cases, the induction heating element 28 penetrates at least partially into the opening of the valve body 14 or the cavity 18 of the valve head 16. The induction heating element 28 comprises a coil of which some turns are shown symbolically in each case. Further components of the induction heater, possibly power feed and power supply or the induction heating element, possibly a magnetic core are not shown.

In FIG. 5A the coil is arranged during inductive heating so that a coil axis about which the turns run, runs in the radial direction (in relation to the valve axis), i.e. perpendicular to the valve axis and perpendicular to the circumferential direction so that the coil axis is perpendicular to the circumferential direction of the opening edge surface 26. Coil ends of the coil (which penetrate at least partially into the cavity, i.e. is arranged at least partially in the cavity) of the induction heating element 28 are located in the vicinity of the opening edge surface 26 so that the highest possible field strength is achieved there. In order to distribute the inductive thermal energy uniformly over the circumference, a rotation of valve body 14 and heating element 28 relative to one another, indicated by an arrow, is provided. The diameter of the coil is adapted to the axial height (i.e. the height in the direction of the valve axis) of the opening edge surface 26. Naturally here also it is possible to use a plurality of induction heating elements (coils) distributed over the circumference. In FIG. 5B the coil is arranged during inductive heating so that the coil axis runs in the direction of the valve axis and preferably coincides with this, wherein a coil end is placed in the cavity 8. In particular, the diameter of the coil is here adapted to a diameter of the opening so that the opening edge surface 26 can be effectively heated. Furthermore, (not shown) the induction heating element can be arranged during the inductive heating so that the coil axis is perpendicular to the opening edge surface 26, the coil axis then therefore runs generally obliquely to the valve axis. This is particularly advantageous in the case of a conical opening edge surface 26. The diameter of the coil is adapted to the width (orthogonal to the circumferential direction) of the opening edge surface 26. The induction heating element is also arranged in this embodiment during the inductive heating so that it projects at least partially into the cavity 8 and that one end of the coil of the induction heating element lies in the vicinity of the opening edge surface, wherein again a rotation of valve body and induction heating element relative to one another is provided (and obviously again a plurality of induction heating elements can be used).

The specific inductive heating of the cover edge surface 24 is shown in FIG. 6. Here as an example two (or also a different number is possible) of induction heating elements 28 are shown each comprising a coil. The coil axes are arranged during the inductive heating so that they are perpendicular to the cover edge surface 24 which here, for example, is conical wherein in each case one coil end comes to lie in the vicinity of the cover edge surface 24. The diameter of the coils is adapted to the width (orthogonal to the circumferential direction) of the cover edge surface 24. It is provided, as indicated by an arrow, to rotate valve cover 12 and induction heating element(s) 28 relative to one another.

The invention claimed is:

1. A method for producing a cavity valve, comprising:
   providing a valve body which has a cavity, wherein the valve body has a circular opening having an opening edge surface on a bottom side;
   providing a circular valve cover with a cover edge surface;
   welding the valve body by friction welding of the opening edge surface to the cover edge surface; wherein
   inductive heating of the opening edge surface and the cover edge surface before welding the valve body to the valve cover.

2. The method according to claim 1, wherein the inductive heating of the opening edge surface and/or cover edge surface is carried out up to a temperature above the recrystallization temperature of a material of valve body or valve cover.

3. The method according to claim 1, further comprising inductive supply of energy by means of an induction heater after the step of welding in order to control a cooling speed.

4. The method according to claim 1, further comprising reworking a valve base surface of the welded cavity valve.

5. The method according to claim 1, comprising
   moving valve body and valve cover towards one another after and/or during the inductive heating until the opening edge surface and the cover edge surface are in contact;
   turning the valve body and the valve cover relative to one another for a predetermined friction welding time interval, wherein opening edge surface and cover edge surface are pressed against one another with a first pressure; and
   pressing the opening edge surface and the cover edge surface onto one another with a second pressure after completing the turning for a predetermined cooling time.

6. The method according to claim 1, wherein the welding takes place under a protective gas.

7. The method according to claim 1, further comprising rotating the valve body or the valve cover relative to an induction heating element during the inductive heating.

8. The method according to claim 1, wherein the inductive heating takes place by means of an induction heater whose frequency is at least 10 kHz.

9. The method according to claim 1, wherein the inductive heating takes place directly at the opening edge surface and/or the cover edge surface, wherein at least 50% of the respective thermal energy is produced in a surface layer under the opening edge surface or the cover edge surface.

10. The method according to claim 9, wherein the surface layer under the opening edge surface or the cover edge surface has a thickness less than 0.5 mm.

11. The method according to claim 1, comprising inductive heating of the opening edge surface, wherein the inductive heating is accomplished by means of an induction heating element which projects into the cavity.

12. The method according to claim 1, further comprising filling a cooling medium into the cavity or a valve stem cavity before the welding.

13. The method according to claim 1, wherein valve body and valve cover consist of different materials.

\* \* \* \* \*